April 12, 1938.  E. E. EDENFIELD  2,114,218
CITRUS FRUIT JUICING MACHINE
Filed April 7, 1936   9 Sheets-Sheet 2

Inventor
Eli E. Edenfield
By L. F. Landreth Jr.
Attorney

April 12, 1938.  E. E. EDENFIELD  2,114,218
CITRUS FRUIT JUICING MACHINE
Filed April 7, 1936   9 Sheets-Sheet 3

Inventor
Eli E. Edenfield

April 12, 1938.  E. E. EDENFIELD  2,114,218
CITRUS FRUIT JUICING MACHINE
Filed April 7, 1936  9 Sheets-Sheet 5

Inventor
Eli E. Edenfield
By L. F. Randolph Jr.
Attorney

Fig. 13.

April 12, 1938. E. E. EDENFIELD 2,114,218
CITRUS FRUIT JUICING MACHINE
Filed April 7, 1936 9 Sheets-Sheet 8

Inventor
Eli E. Edenfield
By L. F. Randolph Jr.
Attorney

Patented Apr. 12, 1938

2,114,218

UNITED STATES PATENT OFFICE 2,114,218

CITRUS FRUIT JUICING MACHINE

Eli E. Edenfield, Lakeland, Fla.

Application April 7, 1936, Serial No. 73,176

9 Claims. (Cl. 146—3)

This invention relates to a machine for extracting the juice from oranges, grapefruit, other citrus fruit or the like.

It is generally aimed to provide a construction which is improved over that disclosed in my copending application filed November 15, 1935, Serial Number 50,039.

The present invention aims more specifically to provide a novel means for halving the fruit, righting it and applying it in the cups or holders.

Another object is to provide a novel type of holder which is substantially closed against leakage and normally maintained closed by spring action.

It is still further aimed to provide a novel juice extracting mechanism particularly wherein the juice mechanism has a movement corresponding to the movement of the fruit for a distance incidental to the reaming action. It is also an object to provide a novel driving and operating means for such extracting or reaming mechanism.

It is still further aimed to provide a structure wherein the juice receiving tank or the like has continuous flanges which enter the halves of the fruit inwardly of the skin and effectively prevent admixture of the undesirable oils of the skin, with the juice of the pulp or part of the fruit inwardly of the skin.

The invention further aims to provide a novel means for feeding or supplying the fruits to a novel conveying means and halving means, and further to provide novel means for opening the cups at desired times and for ejecting the skins therefrom.

Various additional objects and advantages will in part be pointed out hereinafter and will otherwise become apparent from a consideration of the description following taken in connection with accompanying drawings illustrating an operative embodiment.

In said drawings:—

Figure 2 is a side elevation of the improved machine, taken from the reverse side to Figure 1;

Figure 3 is an enlarged detail side elevation of one of the cups and associated mechanism;

Figure 14' is a detail side elevation of the drive for the juice extracting mechanism;

Referring specifically to the drawings wherein like reference characters designate like or similar parts, a suitable framework is provided as at 10 which may conveniently be built in skeleton form of angle iron material as shown although no limitation thereto is to be implied. On such framework 10, particularly mounted by uprights 11 is an auxiliary frame or framework 12. The latter framework 12 journals transverse shafts 13 and 14 respectively at the front and rear on which are fastened sprockets or pulleys 15 and 16, respectively, over which is trained a conveyor 17 having an endless belt or sprocket 18.

This conveyor 17 has equidistantly spaced apart longitudinally thereof, laterally disposed pairs of tines or flights 19, the tines of each pair being equidistantly spaced on opposite sides of the longitudinal center line of the machine.

Said frame 12 mounts a trough-like casing or shute 19' (Figures 2 and 5) particularly covering the rear of the conveyor and the lower run thereof. Associated with the upper run of the conveyor 17 and communicating with the entrance to the shute or the like 19' is a feed hopper 20 for the oranges, grapefruit, other citrus fruit or the like. Said hopper 20 has its bottom wall slanting downwardly from opposite sides so that the fruit will gravitate to positions between the longitudinal pairs of tines 19 and on the conveyor 17, so as to convey the fruit in a single row, rearwardly of the hopper, and thence downwardly and forwardly of the shute 19'. The hopper 20 has an opening 21 in its front wall so that the tines 19 may pass therethrough and an opening 22 in its rear wall so that the tines and the fruit may pass from the hopper into the shute 19'.

Forwardly of the hopper 20, a shaft 23 is journalled transversely auxiliary frame 12 on which a disk cutter 24 is keyed. This cutter preferably has peripheral saw-teeth as at 25. Since the knife or cutter 24 operates on a line longitudinally centrally of the machine and of the pairs of tines 19, the conveyor 17 is formed as two laterally spaced belts 17', as well shown in Figure 11.

Due to the inclination of the bottom of the hopper from opposite sides toward the conveyor, and the fact that the conveyor is slightly inclined in a downward and forward direction, I find that there is less tendency for the fruit to crowd onto the conveyor within the hopper, than is true where the bottom of the hopper is horizontal and the upper run of the conveyor likewise horizontal.

The fruit as it is conveyed forward in the shute 19' between the tines 19 of the lower run of the conveyor, is halved by the rotation of the cutter or knife 24 at the lower part of the latter which extends into the shute. The halves of the fruit are shown at 26, for description with reference to the operation so that the latter will be clear. Such halves are shown, for instance in Figures 6, 8, 9, and 10.

At the forward end of the shute 19' it has flaring or outwardly inclined walls 27 at the sides, providing a widened portion 28 having similar fruit-discharge openings 29 in the bottom thereof, equidistantly spaced from the longitudinal center line of the machine. At the junction of the bottom wall of the shute and the inclined walls 27 cam strips 30 are provided, rising centrally from such bottom wall between the inclined walls 27 are fruit-righting abutments 31 and 32, being similarly shaped on opposite sides of the longitudinal center line of the machine and generally wedge shaped with their narrower edges extending toward the rear of the machine. As a result, the conveyor tines 39 will convey the halves of the fruit 26 in the position in which the fruit is cut until the elements 31 and 27 are reached, which so co-act therewith that the fruit tilts as shown in dotted lines in Figure 6, and slides to a position, aided by the element 32, where the flat faces of the halves are uppermost so that the halves of the fruit will fall through the openings 29 when they register therewith through slight further movement of the tines. An inclined front wall 33 on the shute, aids in deflecting the halves of the fruit downwardly through the openings 29. At the front of shute 19', a horizontal shield or extension 34 is provided.

Operating below the shute 19' in its upper run horizontal and traveling in a forward direction, is a conveyor 35 as best shown in Figures 1, 2, 3, and 11.

Figure 11:
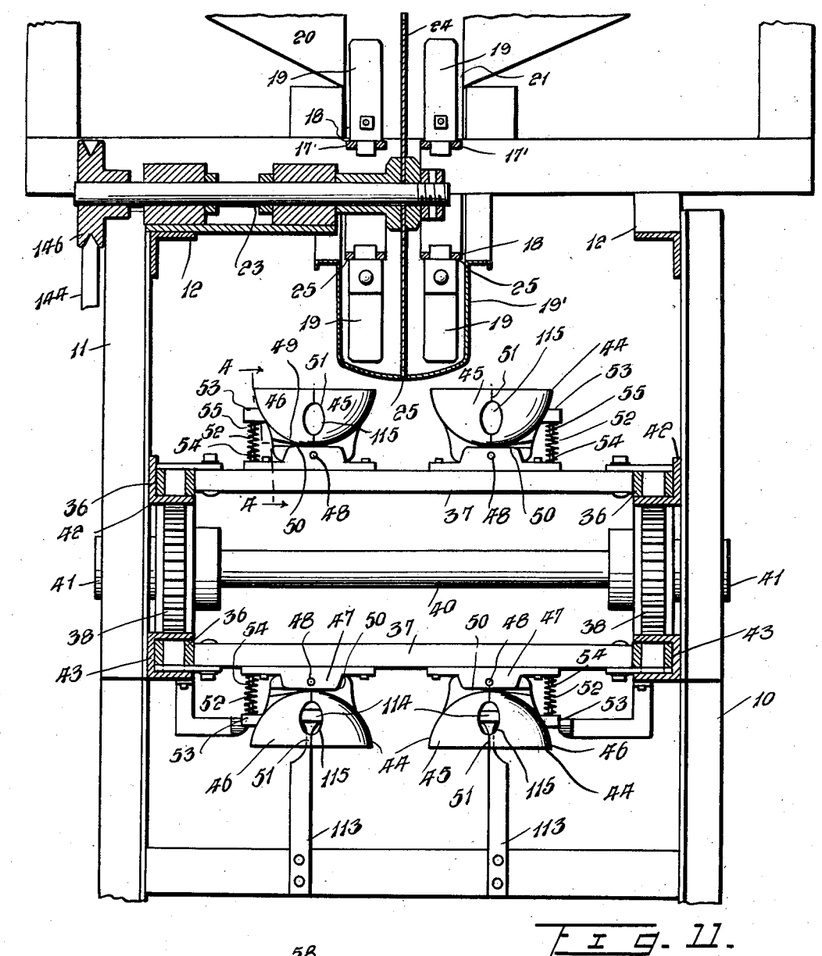
Figure 11 is an enlarged cross-sectional view taken substantially on the line 11—11 of Figure 2.
Figure 12:
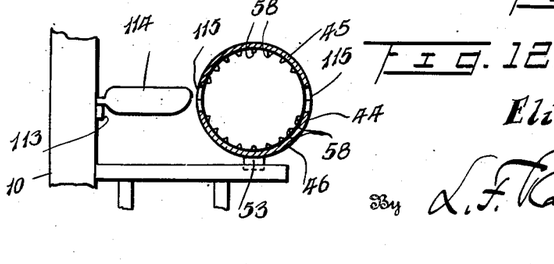
Figure 12 is an inverted plan view particularly showing one of the cups adjacent the skin stripper or remover.

This conveyor consists of two endless chains 36 located at opposite sides thereof cross-bars or slats 37 attached to laterally aligned links of each chain (Figure 11). Such chains are trained over sprocket wheels 38 keyed to shafts 39 and 40, journalled in suitable bearings 41 on the frame 10 adjacent the front and rear thereof, respectively. The upper runs of the chains 36 pass and are guided on the horizontal flanges of angle irons 42 fastened to the frame 10 and the lower runs of such chains pass through and are supported and guided by U-shaped channel members or irons 43 fastened to said framework 10.

Each slat 34 has a pair of shoulders or cups 44 mounted thereon into which the fruit halves or segments are adapted to fall by passage through the openings 29. Such cups 44 are accordingly arranged in two rows, such rows being equidistantly spaced on opposite sides of the longitudinal center of the machine and so as to pass directly below and in registry with the aforesaid discharge openings 29. Said cups consist of six sections 45 and movable sections 46. The six sections 45 may be integral with or rigidly secured to attaching plates 47, bolted or otherwise secured as at 48 to the slats 37. Said sections 46 are pivoted on axes extending longitudinally of the machine as by means of pins 46, to the attaching plates 47. There is sufficient clearance between the parts 46 and the attaching plates to enable the parts or sections 46 to open relatively to the sections or parts 45, such movement being limited by the engagement of the inclined surfaces or the equivalent at 49 on the movable cup sections, with surfaces or elevated portions 50 of the base plates 47. Normally the movable cup sections 46 are maintained closed and in contact with the sections 45 along a central vertical plane as at 51, through the medium of expansive springs 52, engaging the base plates 47 and lugs 53 extending laterally from the movable cup sections 45.

Positioning pins for the springs 52, extend into the latter, from the base or attaching plates 47 and lugs 53 as at 54 and 55, respectively.

The operation of the machine is timed so that a pair of the cups 44 register beneath the openings 29 of the shute and receive two fruit halves, each time the laterally arranged pairs of tines 19 advance a pair of the fruit halves to the aforesaid openings 29. Prior to such registry of the adjacent cups 44 with said openings 29, such cups are opened and maintained opened by depressing the lugs 53 and swinging the movable cup sections 46 outwardly and downwardly to the extent permitted by the engagement of surfaces 49 with surfaces 40. This result is accomplished through the contact of said lugs 53 with depressing cam bars 56 having their lower edges slightly lower than the upper edges of the lugs 53 and having their forward ends chamfered as at 57 to make the impact more gradual. Such cam bars or elements 56 are preferably fastened in any suitable way to the plate or extension 34 and adjacent parts of the frame 10. After the fruit halves are received in the cups 44, slight forward travel of the upper run of the conveyor causes disengagement of the lugs 53 with the cam strips 56, whereupon the expansion of springs 52 closes the cups to effectively hold the fruit halves, augmented by the engagement of the skin of the fruit halves by spurs, teeth or the like as at 58 provided on the interior of the cup sections 45 and 46. The plane or cut surface of the fruit when received in the cups is thus horizontal.

Since the upper run of the belt or conveyor 35 travels forwardly downwardly and rearwardly, the halves of the fruit in the cups are thus inverted and the plane or cut surfaces thereof in the cups are on the lower run, are horizontal and lowermost for extraction of the juice through the operation of extracting or juicing mechanism generally designated 60.

Figure 1:
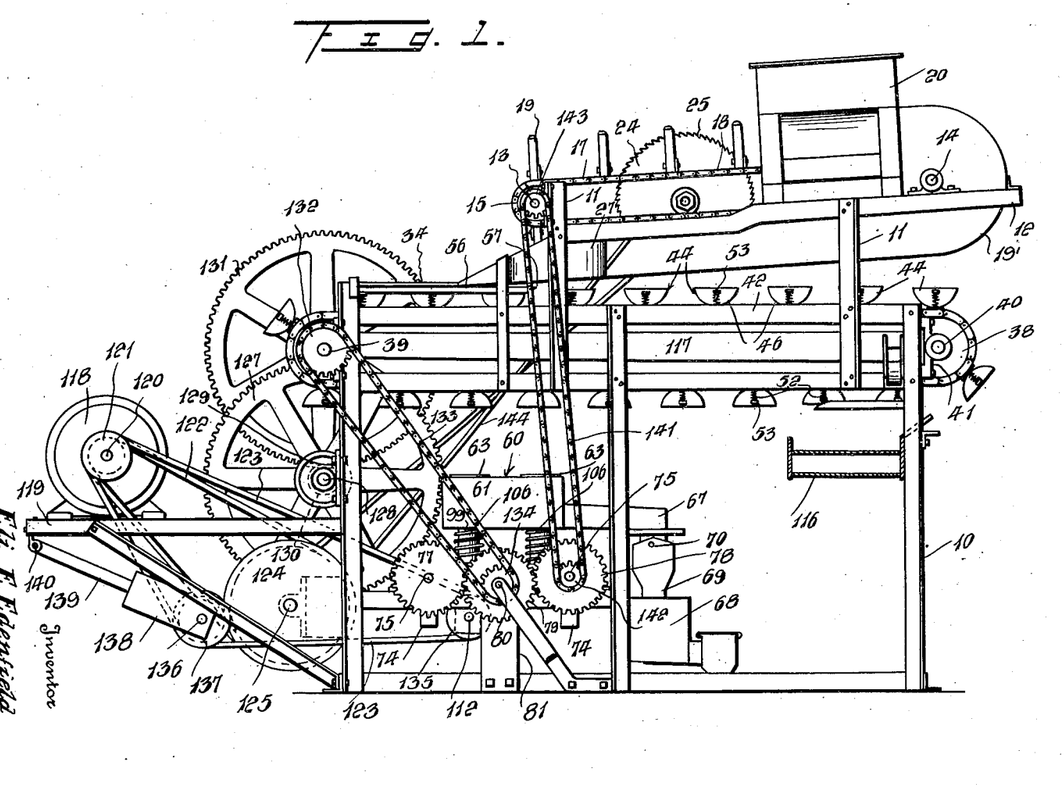
Figure 1 is a side elevation of the improved machine.
Figures 4, 5:
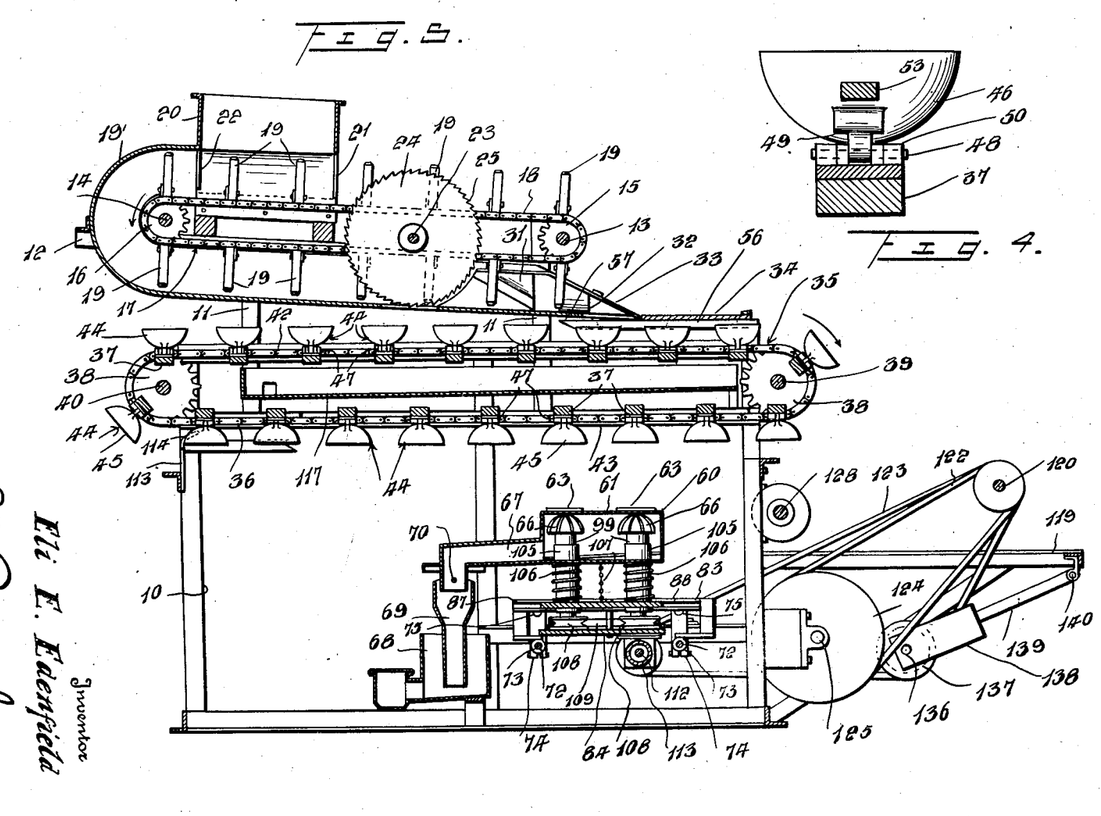
Figure 4 is a detail section taken on the line 4—4 of Figure 11.
Figure 5 is a substantially central longitudinal sectional view taken through the machine.
Figures 6, 7, 8, 9, 10:
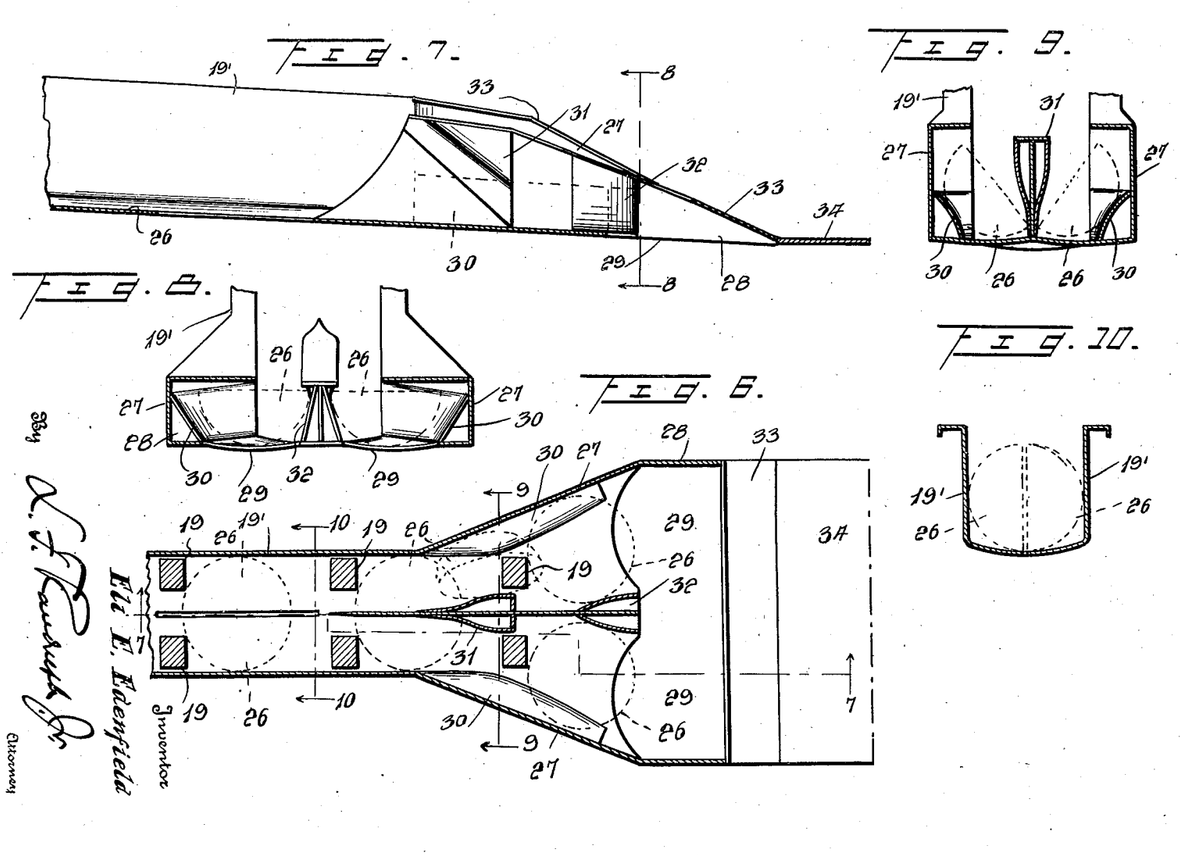
Figure 6 is a detail plan view of the positioning trough or tray for the fruit halves, portions of adjacent structure also being shown.
Figure 7 is a detail longitudinal sectional view taken on the line 7—7 of Figure 6.
Figure 8 is a detail cross-section taken substantially on the line 8—8 of Figure 7.
Figure 9 is a detail cross-section taken on the line 9—9 of Figure 6.
Figure 10 is a detail cross-section taken on the line 10—10 of Figure 6.
Figures 7, 8:
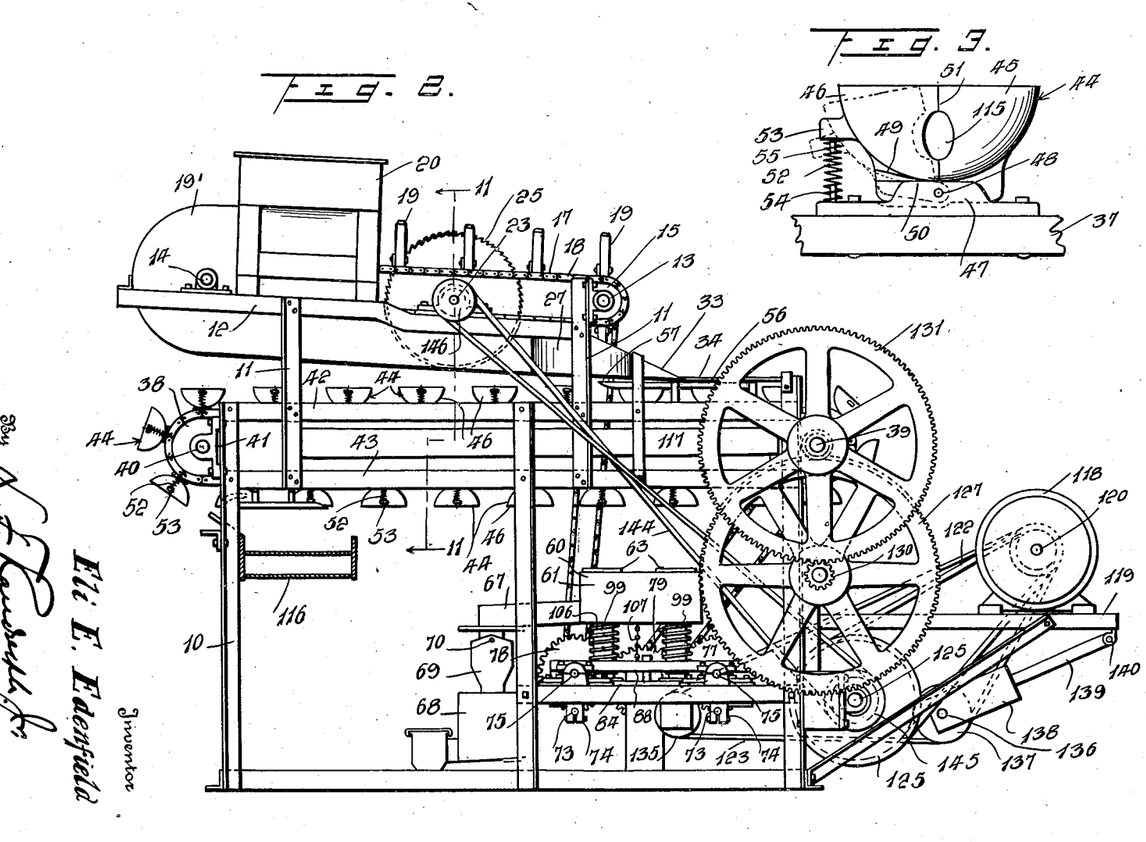
Figure 13:
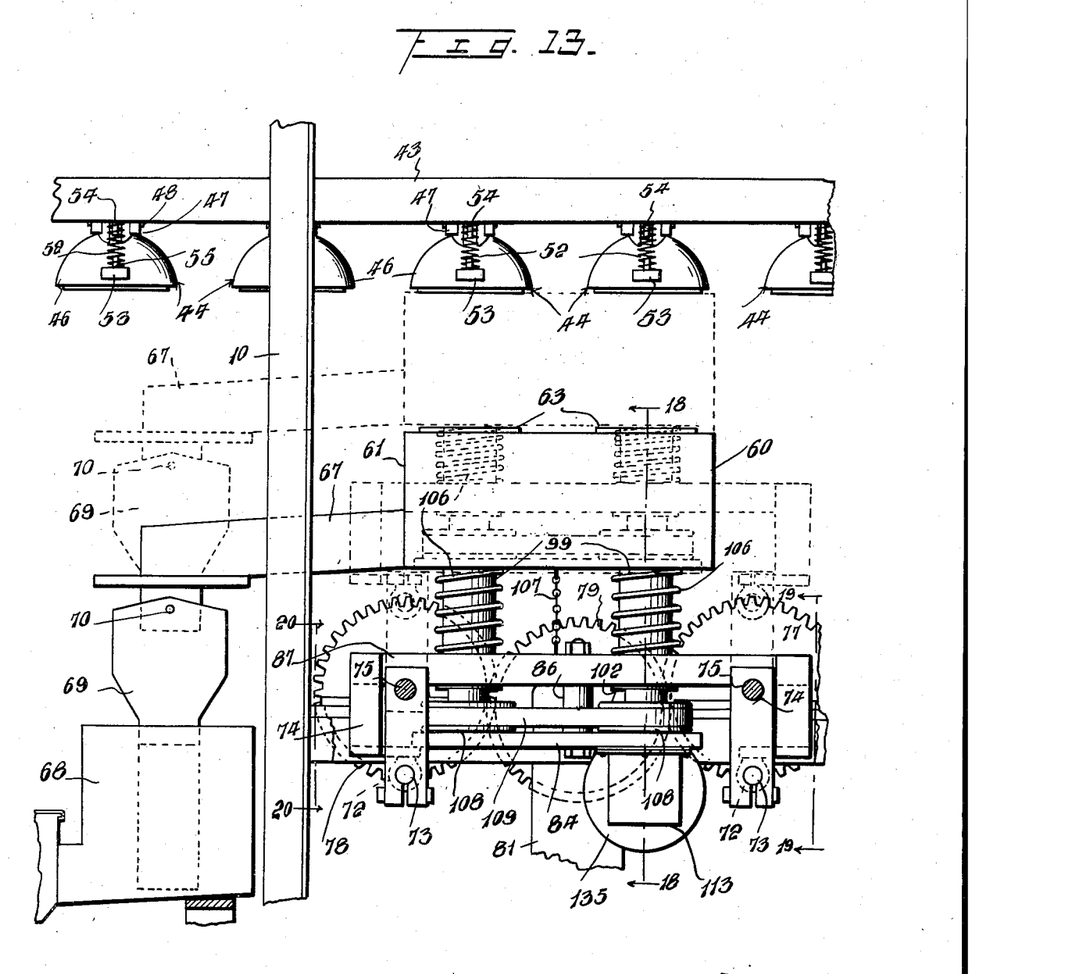
Figure 13 is an enlarged side elevation of the juice extracting mechanism, with associated parts.
Figures 14, 14A:
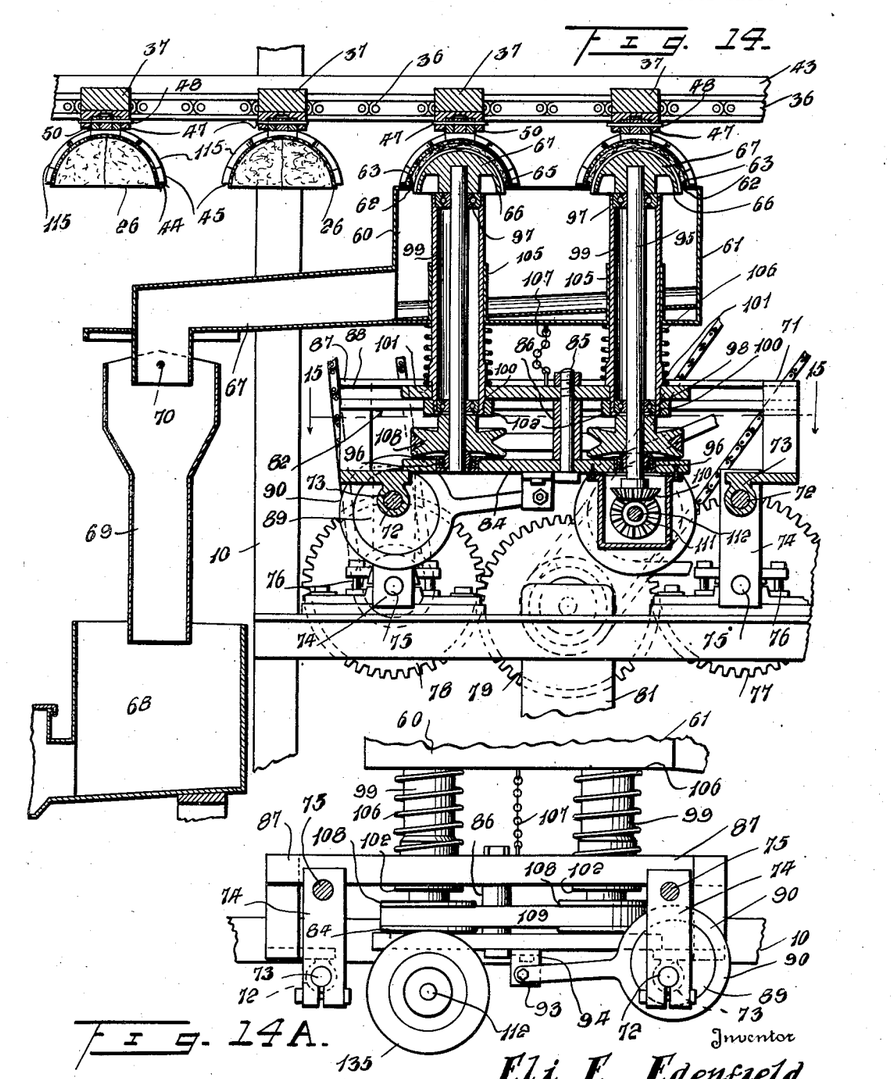
Figure 14 is a view substantially similar to Figure 13 but showing the parts in reaming position in full lines.

Such mechanism being shown in the organization in Figures 1, 2, and 5, and being detailed in Figures 13, 14, 14', 15, and 17 to 20. This mechanism includes a receptacle 61 of suitable shape having four receiving openings 62 in the top wall thereof adapted to simultaneously register with four of the fruit halves with continuous upwardly extending flanges or beads 63 about such openings extending into the fruit pulp 64 and inwardly of the fruit skin as best detailed in Figure 17. To facilitate such engagement, the upper edges of the flanges 63 are preferably sharpened as at 65. Suitable reamers or juice extracting heads 66 are adapted to be projected upwardly and rotated to extract the fruit juice which flows downwardly into the interior of said receptacle 61, discharging through a spout 67 leading therefrom into a collecting receptacle or the like 68. The discharge end of the spout 67 has a section 69 preferably pivotally suspended therefrom as at 70, the section 69 loosely extending into the receptacle 68.

Attention is called to the fact that the flanges 63 effectively prevent admixture of the oils of the skin with the desirable juice of the fruit entering the receptacle 61 and further prevent the reamer from contacting the skin at the edge cut by the knife 25, and thereby prevent the oil or acid from mixing with the fruit juice to the detriment thereof.

Said extractor mechanism is shown retracted in full lines in Figure 13 and as extended and in extracting position in full line in Figure 14. It has a moveable bed or mounting body. Securely fastened to the undersurface of the mount 71 is a pair of parallel transverse hollow or sleeve bearings 72 in which are journalled the crank shafts 73 connected rigidly to crank arms 74 of a shaft 75 whose ends are journalled in suitable bearings 76 on the frame 10.

Such shaft ends have gear wheels or pinions 77 and 78 keyed thereto, respectively, and enmeshed with which gear wheels is an intermediate gear wheel 79 keyed to a transverse shaft 80 journalled in suitable bearings 81 on the frame 10.

Said mount 71 is of skeleton form. Such mount 71 carries a carriage 82 which may consist of upper and lower plates 83 and 84, respectively, rigidly connected together as by means of bolts 85 and spacing tubes 86. Such carriage has a longitudinal movement independently of the mount 71 and the edges of the plate 83 are slidably disposed in grooves 87 of U-shaped guide rails 88, mounted on the mount 71. In order to impart such independent longitudinal movement to the carriage, a cam 89 is secured to one of the sleeve bearings 73 and it is surrounded by an eccentric ring or strap 90 from which an arm 92 extends and which is pivoted as at 93 to a bracket 94 attached to the plate 84 of the carriage.

Reverting to the reaming heads 67, which may be of any suitable construction, they are rigid on vertical shafts 95 journalled in suitable bearings 96 mounted by the plate 84, and in suitable bearings 97 and 98, mounted in the upper and lower end portions of tubular columns 99 rigidly fastened as at 100 to the plate 83 of the carriage, such tubes having shoulders 101 engaging the upper surface of the plate 83 and having nuts 102 threaded to the lower ends of the sleeves or columns 99 and engaging the under surface of the plate 83. The previously mentioned receptacle 61 has interiorly extending cuffs 105 which intimately surround the columns 99 and slidably mount the receptacle 61 on such columns. Expansive coil springs 106 surround the columns 99 between and engage the plate 83 and bottom wall of receptacle 61, urging the receptacle to its uppermost separated position with respect to the carriage 82, limited by a flexible element or chain 107 attached to the mount 71 and to the receptacle 61.

Figure 15:
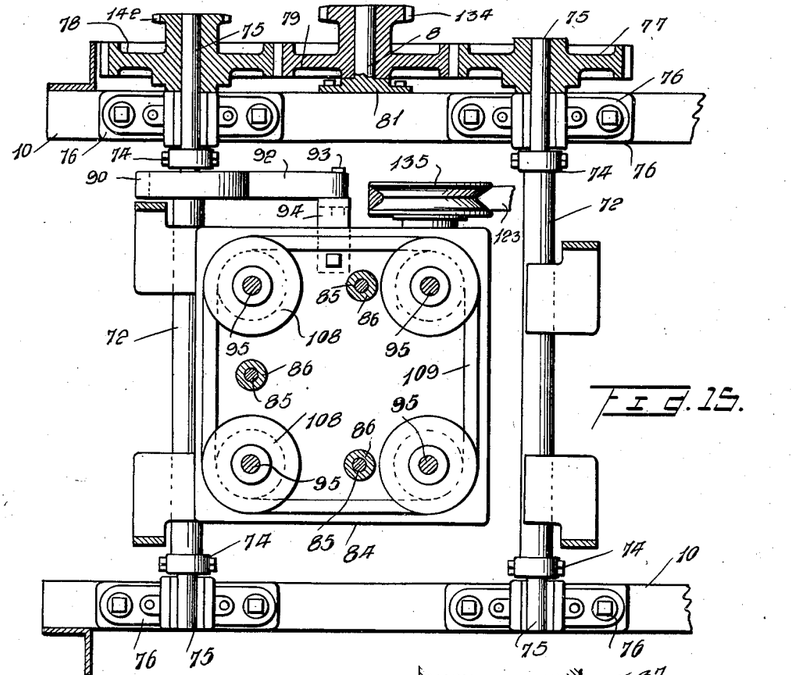
Figure 15 is a horizontal sectional view taken substantially on the plane of line 15—15 of Figure 14.
Figure 16:
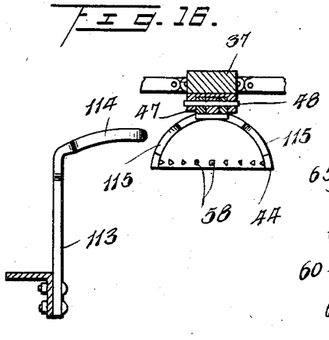
Figure 16 is a detail vertical sectional view particularly showing one of the cups in connection with the skin stripper or remover.

In order to drive the shafts 95 in unison, each has a pulley 108 keyed thereto intermediate the plates 83 and 84 about which an endless, preferably elastic, belt 109 is trained as well shown in Figure 15. One of said shafts 95 extends below the plate 84 of the carriage and has a bevel gear wheel 110 keyed thereto and enmeshed with a bevel gear wheel 111 keyed to a shaft 112, journalled in a transverse boxing 113 disposed transversely of and fastened to the lower surface of the plate 84, the boxing preferably containing bearings 114 for the shaft. The various bearings such as 96, 97, 98, and 114 are preferably ball bearings.

Figure 17:
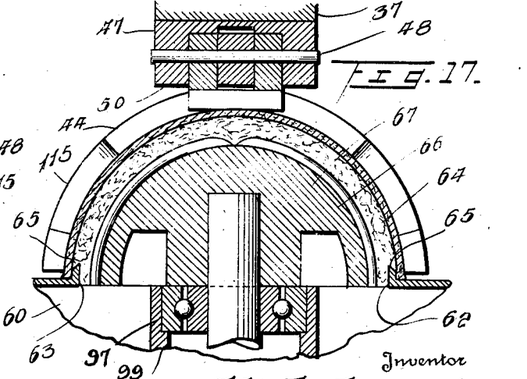
Figure 17 is an enlarged sectional view particularly showing one of the fruit extractors in operative position.
Figure 18:
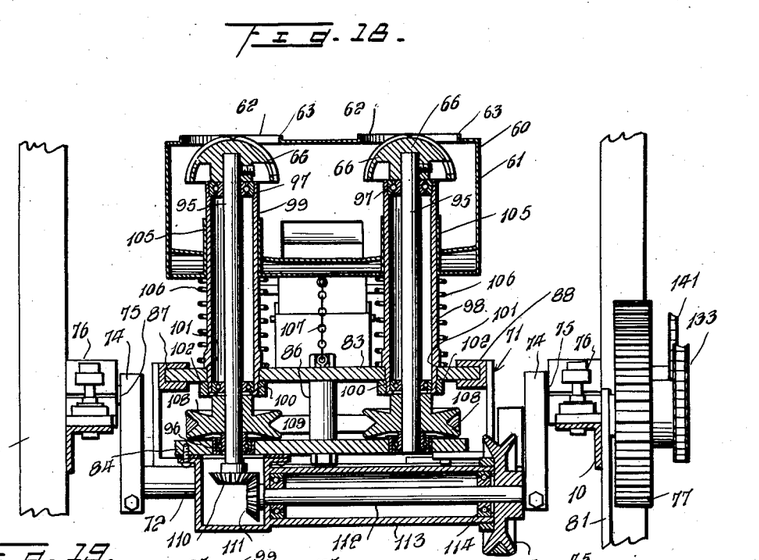
Figure 18 is a sectional view taken on the line 18—18 of Figure 13.
Figure 19:
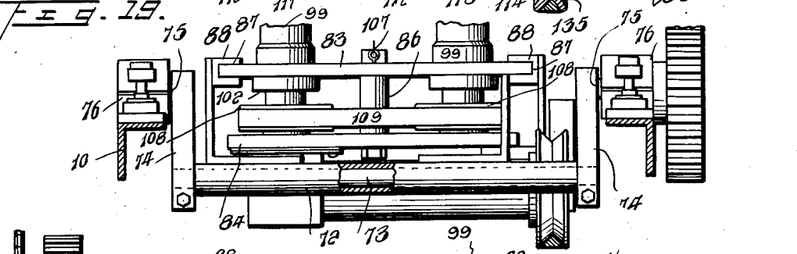
Figure 19 is a sectional view taken on the line 19—19 of Figure 13.
Figure 20:
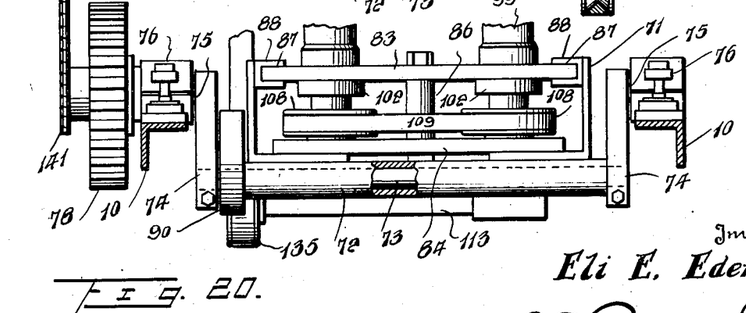
Figure 20 is a sectional view taken on the line 20—20 of Figure 13.

Attention is called to the fact that the extractor parts, are driven by the specific gearing hereinafter described, ream four of the orange halves at a time. The swinging of the crank arms 74 moves the mount 71 from the full line position shown in Figure 13 to the dotted line position shown in the same figure and which corresponds to the full line or reaming position shown in Figure 14. Before the mount 71 reaches its upper limit, the flanges 63 are thrust into the pulp of the fruit as shown in Figure 17, following which the springs 106 are somewhat compressed as the mount reaches its upper limit, the structure thus insuring effective engagement of the receptacle with the fruit halves. The juice is at such time extracted through the rotation of the extractor or reamer heads 67 caused by the rotation of shafts 95, their pulleys 108, belts 109, gears 110 and 111, and the driving of the shaft 112.

Particular attention is called to the fact that a substantially rectilinear movement of the extractor heads into and out of engagement with the fruit is avoided in view of the provision of the cam 89 and eccentric strap connection 90 with the carriage 82.

This feature provides for a slight period of travel of the carriage and extractors or reamers 67 with and corresponding to the conveyor movement of the fruit, prior to and slightly after the time of engagement with the fruit so as to more effectively ream the fruit and extract the juice. In other words, there is substantially a dwell of the extractor heads with the fruit halves during the period of fruit juice extraction. The pivotal mounting of the spout 69 permits swinging or yielding thereof with respect to the receptacle 68, incidental to the motion of the extracting mechanism.

After the extraction of the juice from the fruit halves the skins of the fruit halves remaining in the cups are removed by a pair of strippers 113 best shown in Figures 2, 11, 12, and 16. These strippers have substantially forwardly extending stripping fingers 114 adapted to enter openings 115 provided in the meeting side edges of the cup sections 45 and 46. Since the stripping fingers 114 are stationary, when they enter the openings 115 as the cups advance, the cup sections are forcibly opened and the fruit skins stripped or removed, falling downwardly onto an adjacent shelf, conveyor or the like 116 carried by the frame 10, to facilitate their disposal.

Attention is called to the fact that the openings 115 are relatively small, and arranged above the bottoms of the cups, so as to maintain the cups closed as tightly as possible at their meeting edges, to prevent any unnecessary waste or loss of the juice.

A pan 117 is carried by frace 10 in horizontal position intermediate the runs of the conveyor 35 to catch and drain off, for instance onto the shelf or conveyor 16, undesirable drippings.

The power for operating the various shafts may be taken from any source, usually a prime mover, such as the electric motor 118.

Said motor 118 may be mounted on a rearwardly extending shelf 119 of the frame 10. Such motor through the medium of its driving shaft 120 and one or more pulleys 121, drives endless belts 122 and 123. Said belt 122 drives a pulley 124 fixed on a suitably journalled shaft 125 on frame 10. Shaft 125 has a pinion 126 thereon enmeshed with a gear wheel 127, keyed to a shaft 128, journalled in bearings 129 on the frame 10. Said shaft 128 has a pinion 130 thereon enmeshed with a gear wheel 131, keyed to the shaft 39, said shaft 39, which drives the cup conveyor 35, has a sprocket wheel 132 thereon over which a sprocket chain 133 is trained and which traverses a sprocket wheel 134, forming part of the gear wheel 79, in order to operate the gear wheels 77 and 78 to actuate the extracting mechanism except the independent superposed motion of the carriage 82, which is effected through the belt 123 traversing a pulley 135 keyed to the shaft 112. Said belt 123 also passes over a pulley 136 journalled on a shaft 137 carried by the weighted portion 138 of an arm 139, pivoted at 140 to the shelf 119. The weight 138 maintains the belt 123 taut and at the same time permits the movement thereof to compensate for the change in position of a pulley 135 and connected parts.

A sprocket chain 141 traverses a sprocket 142 on shaft 75 and a sprocket 143 on the shaft 14, which drives the fruit-feeding conveyors 18.

The fruit halving cutter 25 is preferably driven by a crossed belt 144 traversing a pulley 145 keyed to shaft 125, and also traversing a pulley 146 keyed to the shaft 23.

As a résumé of the operation, the oranges, grapefruit, other citrus fruit or the like in the hopper 20 gravitates toward the center thereof and is engaged on at a time between four of the tines 19, being conveyed rearwardly, downwardly and forwardly through the shute 19' past the cutter 24 which halves the fruit in a vertical plane, following which the halved fruit is moved into contact with the element 31 and surfaces 30 and 32 which positions the fruit so that the plane of cutting is uppermost, in which position, the fruit falls through openings 29 in the shute 19' into the open pair of cups 44 therebeneath, the cups having been opened by the travel of the lugs 53 thereon into contact with the cam bars 56.

Short movement of the conveyor 35 carries the filled cups forwardly out of engagement with the cam members 56, whereupon the springs 52 close the cups and the cups and fruit are inverted and at the next stage are engaged by the reaming heads 67 in the specific manner hereinbefore detailed, following which, the skins of the fruit are stripped from the cups as the openings of the cups 115 receive the stripping fingers 114.

Various changes may be resorted to provided they fall within the spirit and scope of the invention.

I claim as my invention:—

1. A machine of the class described having a hopper to receive fruit to be cut into segments, a trough communicating with the hopper extending rearwardly, downwardly and forwardly therefrom, a vertically disposed endless conveyor mounted by said trough and consisting of laterally spaced apart sections, a disk cutter operable below the lower run of said conveyor between the sections in advance of the trough, said sections having spaced apart tines movable through the hopper to convey fruit to and past the cutter for severance into segments, and means operable thereafter to extract the juice from the segments.

2. A machine of the class described having a hopper to receive fruit to be cut into segments, a trough communicating with the hopper extending rearwardly, downwardly and forwardly therefrom, a vertically disposed endless conveyor mounted by said trough and consisting of laterally spaced apart sections, a disk cutter operable below the lower run of said conveyor between the sections in advance of the trough, said sections having spaced apart tines movable through the hopper to convey fruit to and past the cutter for severance into segments, said trough adjacent its forward end having discharge openings in its bottom wall for the fruit segments, and an inclined wall above the bottom wall engageable by the fruit to aid the discharge of the segments.

3. A device of the class described comprising a trough, means operable therein to halve fruit, a central element therein in the plane of the fruit halving means, cam elements on opposite sides of the central element and extending along the same, the forward and lower portions thereof contacting the central element, and the rearward and upper portions thereof diverging rearwardly and upwardly, endless conveying means mounted to operate in the trough and on each side of the central element and past the cam elements to convey the halved fruit, the said cam elements being stationary and, co-acting to vary the position of the halved fruit through the advancing movement of the fruit, to present the cut surface thereof uppermost.

4. A device of the class described comprising a trough, means operable therein to halve fruit, a central element therein in the plane of the fruit halving means, cam elements on opposite sides of the central element and extending along the same, the forward and lower portions thereof contacting the central element, and the rearward and upper portions thereof diverging rearwardly and upwardly, endless conveying means mounted to operate in the trough and on each side of the central element and past the cam elements to convey the halved fruit, the said cam elements being stationary and, co-acting to vary the position of the halved fruit through the advancing movement of the fruit, to present the cut surface thereof uppermost, said trough forwardly of the elements having discharge openings in the bottom thereof for the halved fruit, means to engage the halved fruit discharged through said openings, and juice extracting means engageable with the halved fruit when held by the last mentioned means.

5. A machine of the class described having a forwardly inclined trough, a hopper communicating with the upper portion of the trough, the bottom of said hopper inclining correspondingly to the trough and also inclining downwardly and inwardly, a feeding conveyor in spaced sections operable through the hopper and trough, said sections having perpendicular tines thereon in spaced relation to move the fruit rearwardly, downwardly and forwardly, a disk cutter carried by the trough operable in the lower portion thereof in advance of the hopper and said trough in advance of the cutter being widened and having stationary cam elements to alter the position of the cut segments of fruit through the advancing movement of the fruit to dispose the cut surfaces uppermost.

6. A machine of the class described having conveyor means to move fruit in a predetermined direction, a mounting body, means operable to oscillate said body with respect to the fruit being conveyed, a carriage slidably mounted by said body, mechanism operable during the oscillation of the body to slide said carriage relatively to the body at the same speed as the conveyor means and in the direction of movement of the conveyor means, and juice extracting means mounted on said carriage and engageable with the fruit during said oscillation of the body.

7. A machine of the class described having conveyor means to move fruit in a predetermined direction, a mounting body, means operable to oscillate said body with respect to the fruit being conveyed, a carriage slidably mounted by said body, mechanism operable during the oscillation of the body to slide said carriage relatively to the body, and juice extracting means mounted on said carriage and engageable with the fruit during said oscillation of the body, comprising columns rising from the carriage disposed about the extractor means, a receptacle having openings in which the extractor means operate, said receptacle having cuffs slidable on the columns, flexible means limiting the movement of the receptacle away from the carriage, and spring means surrounding one of the columns and co-acting with the carriage and receptacle to urge the latter away from the carriage.

8. A machine of the class described having conveyor means to move fruit in a predetermined direction, a mounting body, means operable to oscillate said body with respect to the fruit being conveyed, a carriage slidably mounted by said body, mechanism operable during the oscillation of the body to slide said carriage relatively to the body, and juice extracting means mounted on said carriage and engageable with the fruit during said oscillation of the body, comprising columns rising from the carriage disposed about the extractor means, a receptacle having openings in which the extractor means operate, said receptacle having cuffs slidable on the columns, flexible means limiting the movement of the receptacle away from the carriage, spring means surrounding one of the columns and co-acting with the carriage and receptacle to urge the latter away from the carriage, a flange about each opening of the receptacle adapted to extend into the said fruit inwardly of the skin, driving means operable to oscillate said body, and said driving means having a separate connection operable to slide the carriage relatively to the body and during the oscillation of the body.

9. A machine of the class described having juice extracting mechanism comprising a receptacle provided with a substantially round juice receiving opening, reamer means occupying and extending above the opening for engagement with a fruit segment having a skin, a continuous flange about said opening extending outwardly therefrom, an inverted cup shaped holder for the fruit segment registrable over the said opening with its margin spaced relatively close to and outwardly of the flange to enable the flange to enter the fruit between the skin and pulp.

ELI E. EDENFIELD.